US012420659B2

(12) United States Patent
Ehara et al.

(10) Patent No.: US 12,420,659 B2
(45) Date of Patent: Sep. 23, 2025

(54) ELECTRIC POWER MANAGEMENT SYSTEM, ELECTRIC POWER MANAGEMENT SERVER, AND ELECTRIC POWER MANAGEMENT METHOD

(71) Applicant: TOYOTA JIDOSHA KABUSHIKI KAISHA, Toyota (JP)

(72) Inventors: Masato Ehara, Susono (JP); Rentaro Kuroki, Susono (JP); Shunsuke Kobuna, Susono (JP); Tatsuro Kiyohara, Hiratsuka (JP); Naohiro Seo, Sunto-gun (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 760 days.

(21) Appl. No.: 17/660,871

(22) Filed: Apr. 27, 2022

(65) Prior Publication Data

US 2023/0019846 A1 Jan. 19, 2023

(30) Foreign Application Priority Data

Jul. 16, 2021 (JP) ................................ 2021-118085

(51) Int. Cl.
*B60L 53/66* (2019.01)
*B60L 50/53* (2019.01)
(Continued)

(52) U.S. Cl.
CPC ............... *B60L 53/66* (2019.02); *B60L 50/53* (2019.02); *B60L 53/62* (2019.02); *B60L 58/12* (2019.02); *B60L 53/67* (2019.02)

(58) Field of Classification Search
None
See application file for complete search history.

(56) References Cited

U.S. PATENT DOCUMENTS 8,676,401 B2 * 3/2014 Asada .................... B60L 53/66 701/2
11,104,246 B2 * 8/2021 Reynolds ............. B60L 53/665
(Continued)

FOREIGN PATENT DOCUMENTS

JP 2020-115704 A 7/2020
JP 2020-195208 A 12/2020
WO WO 2013/035481 A1 3/2013

*Primary Examiner* — Julian D Huffman
*Assistant Examiner* — Sadia Kousar
(74) *Attorney, Agent, or Firm* — Finnegan, Henderson, Farabow, Garrett and Dunner, LLP

(57) ABSTRACT

An electric power management system includes a plurality of the vehicles, each including a battery, and a server that manages an exchange of electric power between the battery and an electric power system of an electric power company. The server detects a predetermined operation of a user that correlates with termination of the exchange of the electric power between the battery and the electric power system. When the predetermined operation is detected, the server calculates an estimated time when the exchange of the electric power between the battery and the electric power system is terminated, and executes a process of distributing the electric power to be exchanged by the vehicle in which the exchange of the electric power with the electric power system is estimated to be terminated at the calculated estimated time to another vehicle that performs the exchange of the electric power with the electric power system.

13 Claims, 6 Drawing Sheets

(51) Int. Cl.

| | |
|---|---|
| ***B60L 53/62*** | (2019.01) |
| ***B60L 58/12*** | (2019.01) |
| *B60L 53/67* | (2019.01) |

(56) References Cited

U.S. PATENT DOCUMENTS

| | | | | |
|---|---|---|---|---|
| 2013/0131911 | A1* | 5/2013 | Smith ................ | B60H 1/00985 701/29.1 |
| 2020/0231056 | A1 | 7/2020 | Sadano et al. | |
| 2020/0384887 | A1 | 12/2020 | Yokoyama et al. | |
| 2020/0398693 | A1* | 12/2020 | Haraguchi ........ | H02J 13/00006 |

* cited by examiner

1
E1
11
12
13
10
ELECTRIC POWER COMPANY
UPPER AGGREGATOR
20A
20B
E2
LOWER AGGREGATOR
30A
30B
E3
EMS
60
40
EVSE
50
130

ELECTRIC POWER MANAGEMENT SYSTEM, ELECTRIC POWER MANAGEMENT SERVER, AND ELECTRIC POWER MANAGEMENT METHOD

CROSS-REFERENCE TO RELATED APPLICATION

This application claims priority to Japanese Patent Application No. 2021-118085 filed on Jul. 16, 2021, incorporated herein by reference in its entirety.

BACKGROUND

1. Technical Field

The present disclosure relates to an electric power management system, an electric power management server, and an electric power management method, and in particular, to an electric power management system, an electric power management server, and an electric power management method for exchanging electric power with an electric system of a counterparty of the exchange of the electric power.

2. Description of Related Art

In the related art, there has been an electric power transmission-reception management device that connects a large number of vehicles to an electric power network in order to meet an electric power demand (refer to, for example, Japanese Unexamined Patent Application Publication No. 2020-115704 (JP 2020-115704 A)). The electric power transmission-reception management device described in JP 2020-115704 A acquires information indicating the electric power demand in the electric power network, selects a vehicle provided with a drive power source of which an accumulated energy amount is larger than a predetermined accumulated amount and an accumulable energy amount is larger than a predetermined accumulable amount as a vehicle that transmits and receives the electric power to and from the electric power network in accordance with the electric power demand, and transmits a notification to a user of the selected vehicle.

SUMMARY

However, in a system such as the system described in JP 2020-115704 A, termination time of electric power transmission-reception between the vehicle and the electric power network is unknown, and there is a possibility that, when the vehicle suddenly leaves at a time different from the planned time and thus transmission-reception of the electric power between the vehicle and the electric power network is terminated, tracking of fluctuations in the electric power transmitted and received between the electric power network and a plurality of vehicles including the vehicle may be delayed.

The present disclosure is made to solve the above-mentioned issue, and an object of the present disclosure is to provide an electric power management system, an electric power management server, and an electric power management method capable of suppressing fluctuations in the exchanged electric power due to unplanned leaving of the vehicle during the exchange of the electric power with the counterparty of the exchange of the electric power.

An electric power management system according to the present disclosure is an electric power management system that performs an exchange of electric power with an electric power system of a counterparty of the exchange of the electric power, and includes a plurality of the vehicles, each including an electric power storage device, and a server that manages an exchange of the electric power between the electric power storage device of each of the vehicles and the electric power system. The server detects a predetermined operation of a user that correlates with termination of the exchange of the electric power between the electric power storage device and the electric system, calculates, when the predetermined operation is detected, an estimated time when the exchange of the electric power between the electric power storage device and the electric system is terminated based on time when the predetermined operation is detected, and executes a process of distributing the electric power to be exchanged by the vehicle in which the exchange of the electric power with the electric system is estimated to be terminated at the calculated estimated time to another vehicle that exchanges the electric power with the electric system.

With the configuration above, the electric power to be exchanged by the vehicle in which the exchange of the electric power between the electric power storage device of the vehicle and the electric system of the counterparty of the exchange of the electric power is estimated to be terminated at the estimated time that is calculated based on the time when the predetermined operation of the user that correlates with termination of the exchange of the electric power is detected is distributed to the other vehicle. As a result, it is possible to provide the electric power management system capable of suppressing fluctuations in the exchanged electric power due to the unplanned leaving of the vehicle during the exchange of the electric power with the counterparty of the exchange of the electric power.

The predetermined operation may be a predetermined operation performed on the vehicle. With the configuration above, it is possible to suppress fluctuations in the exchanged electric power due to unplanned leaving of the vehicle triggered by the predetermined operation performed on the vehicle.

The predetermined operation may be an operation performed on a predetermined object until the user reaches the vehicle. With the configuration above, it is possible to suppress fluctuations in the exchanged electric power due to unplanned leaving of the vehicle triggered by the operation performed on the predetermined object until the user reaches the vehicle.

The exchange of the electric power between the electric power storage device of the vehicle and the electric system of the counterparty may be to supply the electric power from the electric power storage device to the electric system. With the configuration above, when the electric power is supplied from the electric power storage device of the vehicle to the electric system of the counterparty, fluctuations in the exchanged electric power due to unplanned leaving of the vehicle can be suppressed.

The exchange of the electric power between the electric power storage device of the vehicle and the electric system of the counterparty may be to reduce supply of the electric power from the electric system to the electric power storage device. With the configuration above, when the supply of the electric power from the electric system of the counterparty to the electric power storage device of the vehicle is reduced, fluctuations in the exchanged electric power due to unplanned leaving of the vehicle can be suppressed.

The exchange of the electric power between the electric power storage device of the vehicle and the electric system of the counterparty may be to increase supply of the electric power from the electric system to the electric power storage device. With the configuration above, when the supply of the electric power from the electric system of the counterparty to the electric power storage device of the vehicle is increased, fluctuations in the exchanged electric power due to unplanned leaving of the vehicle can be suppressed.

According to another aspect of the present disclosure, an electric power management server is an electric power management server that is included in an electric power management system for performing an exchange of electric power with an electric system of a counterparty of the exchange of the electric power, and that includes a control unit that manages an exchange of the electric power between an electric power storage device of each of a plurality of vehicles and the electric system. The control unit detects a predetermined operation of a user that correlates with termination of the exchange of the electric power between the electric power storage device and the electric system, calculates, when the predetermined operation is detected, an estimated time when the exchange of the electric power between the electric power storage device and the electric system is terminated based on time when the predetermined operation is detected, and executes a process of distributing the electric power to be exchanged by the vehicle in which the exchange of the electric power with the electric system is estimated to be terminated at the calculated estimated time to another vehicle that exchanges the electric power with the electric system.

With the configuration above, it is possible to provide the electric power management server capable of suppressing fluctuations in the exchanged electric power due to the unplanned leaving of the vehicle during the exchange of the electric power with the counterparty of the exchange of the electric power.

According to still another aspect of the present disclosure, an electric power management method is an electric power management method executed by a server that is included in an electric power management system for performing an exchange of electric power with an electric system of a counterparty of the exchange of the electric power, and that includes a control unit that manages an exchange of the electric power between an electric power storage device of each of a plurality of vehicles and the electric system, and includes: a step in which the control unit detects a predetermined operation of a user that correlates with termination of the exchange of the electric power between the electric power storage device and the electric system; a step in which the control unit calculates, when the predetermined operation is detected, an estimated time when the exchange of the electric power between the electric power storage device and the electric system is terminated based on time when the predetermined operation is detected; and a step in which the control unit executes a process of distributing the electric power to be exchanged by the vehicle in which the exchange of the electric power with the electric system is estimated to be terminated at the calculated estimated time to another vehicle that exchanges the electric power with the electric system.

With the configuration above, it is possible to provide the electric power management method capable of suppressing fluctuations in the exchanged electric power due to the unplanned leaving of the vehicle during the exchange of the electric power with the counterparty of the exchange of the electric power.

According to the present disclosure, it is possible to provide the electric power management system, the electric power management server, and the electric power management method capable of suppressing fluctuations in the exchanged electric power due to the unplanned leaving of the vehicle during the exchange of the electric power with the counterparty of the exchange of the electric power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
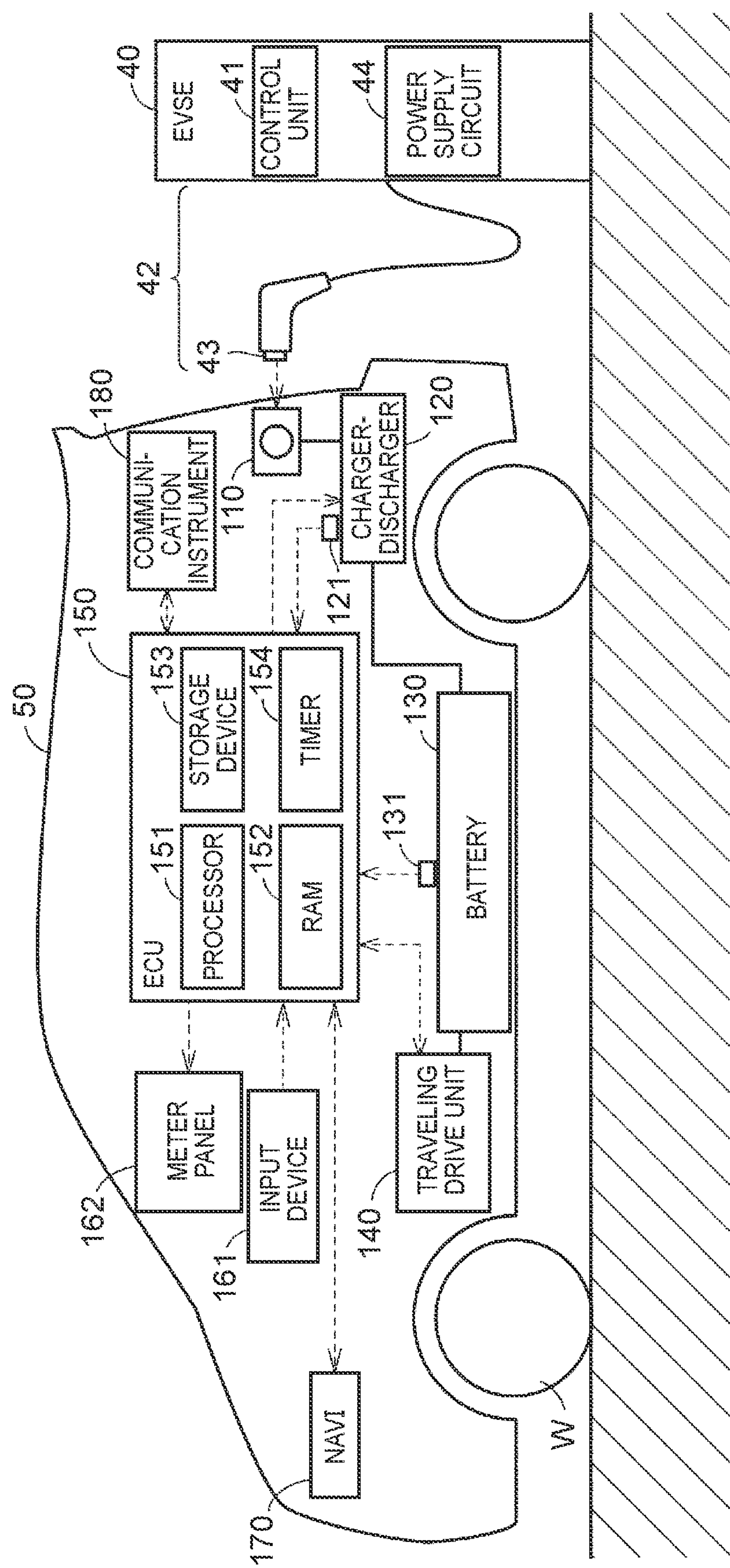
FIG. 1 is a diagram showing a configuration of a vehicle according to the present embodiment.

Hereinafter, an embodiment of the present disclosure will be described in detail with reference to the drawings. In the drawings, the same or corresponding parts are denoted by the same reference signs and the description thereof will be not be repeated. In the following descriptions, an energy management system will be referred to as an "EMS". Further, an electronic control unit mounted on the vehicle will be referred to as an "ECU".

First Embodiment

FIG. 1 is a diagram showing a configuration of a vehicle 50 according to the present embodiment. With reference to FIG. 1, the vehicle 50 includes a battery 130 that stores electric power for causing the vehicle 50 to travel. The vehicle 50 is configured to be travelable using the electric power stored in the battery 130. The vehicle 50 according to the present embodiment is a battery electric vehicle (BEV) without an engine (internal combustion engine).

The battery 130 is configured to include a secondary battery such as a lithium ion battery or a nickel metal hydride battery. In the present embodiment, as the secondary battery, an assembled battery including a plurality of lithium ion batteries is adopted. The assembled battery is composed of a plurality of secondary batteries (that is generally also referred to as "cells"). The secondary batteries are electrically connected to each other.

The vehicle 50 includes an ECU 150. The ECU 150 is configured to execute charge control and discharge control of the battery 130. Further, the ECU 150 is configured to control communication with the outside of the vehicle 50.

The vehicle 50 further includes a monitoring module 131 that monitors the state of the battery 130. The monitoring module 131 includes various sensors for detecting the state of the battery 130 (for example, voltage, current, and temperature), and outputs the detection result to the ECU 150. The monitoring module 131 may be a battery management system (BMS) having a state of charge (SOC) estimation function, a state of health (SOH) estimation function, a cell voltage equalization function, a diagnostic function, and a communication function, in addition to the above sensor function. The ECU 150 can acquire the state of the battery 130 (for example, temperature, current, voltage, SOC, and internal resistance) based on the output of the monitoring module 131.

Electric vehicle supply equipment (EVSE) 40 includes a control unit 41, a power supply circuit 44, and a charging cable 42. The control unit 41 and the power supply circuit 44 are built in a main body of the EVSE 40. The charging cable 42 is connected to the main body of the EVSE 40. The charging cable 42 may be always connected to the main body of the EVSE 40, or may be detachable from the main body of the EVSE 40. The charging cable 42 includes a connector 43 at the tip thereof and includes a power line inside. The control unit 41 controls the power supply circuit 44.

The vehicle 50 includes an inlet 110 and a charger-discharger 120 for contact charging. The inlet 110 is configured to receive the electric power supplied from the outside of the vehicle 50. The inlet 110 is configured such that the connector 43 of the charging cable 42 is connectable to the inlet 110. When the connector 43 of the charging cable 42 connected to the main body of the EVSE 40 is connected (plugged in) to the inlet 110 of the vehicle 50, the vehicle 50 is in a chargeable state (that is, a state in which the vehicle 50 can receive electric power supply from the EVSE 40). FIG. 1 shows only the inlet 110 and the charger-discharger 120 compatible with the electric power supply method of the EVSE 40. However, the vehicle 50 may include a plurality of inlets such that the vehicle 50 can support a plurality of types of electric power supply methods (for example, alternate current (AC) method and direct current (DC) method).

The charger-discharger 120 is located between the inlet 110 and the battery 130. The charger-discharger 120 includes a relay for switching connection and disconnection of an electric power path from the inlet 110 to the battery 130, and an electric power conversion circuit (both not shown). The electric power conversion circuit may include a bidirectional converter. Each of the relay and the electric power conversion circuit included in the charger-discharger 120 is controlled by the ECU 150. The vehicle 50 further includes a monitoring module 121 that monitors the state of the charger-discharger 120. The monitoring module 121 includes various sensors for detecting the state of the charger-discharger 120, and outputs the detection result to the ECU 150. In the present embodiment, the monitoring module 121 is configured to detect the voltage and current input to the electric power conversion circuit and the voltage and current output from the electric power conversion circuit. The monitoring module 121 is configured to be able to detect the charging electric power of the battery 130.

In the vehicle 50 in the chargeable state, external charging (that is, charging the battery 130 with the electric power supplied from the EVSE 40) and external electric power supply (that is, electric power supply from the vehicle 50 to the EVSE 40) are possible. The electric power for the external charging is supplied, for example, from the EVSE 40 to the inlet 110 through the charging cable 42. The charger-discharger 120 is configured to convert the electric power received by the inlet 110 into electric power suitable for charging the battery 130, and output the converted electric power to the battery 130. The electric power for the external electric power supply is supplied from the battery 130 to the charger-discharger 120. The charger-discharger 120 is configured to convert the electric power supplied from the battery 130 into electric power suitable for the external electric power supply and output the converted electric power to the inlet 110. When any of the external charging and the external electric power supply is executed, the relay of the charger-discharger 120 is closed (connected). When both of the external charging and the external electric power supply are not executed, the relay of the charger-discharger 120 is opened (disconnected).

The ECU 150 includes a processor 151, a random access memory (RAM) 152, a storage device 153, and a timer 154. The ECU 150 may be a computer. The processor 151 may be a central processing unit (CPU). The RAM 152 functions as a working memory for temporarily storing the data processed by the processor 151. The storage device 153 is configured to be able to store the stored information. The storage device 153 includes, for example, a read-only memory (ROM) and a rewritable non-volatile memory. In addition to a program, the storage device 153 stores information used in the program (for example, maps, mathematical formulas, and various parameters). In the present embodiment, as the processor 151 executes the program stored in the storage device 153, various controls in the ECU 150 are executed. However, the various controls in the ECU 150 are not limited to execution by software, and execution by dedicated hardware (electronic circuit) is possible. The number of processors included in the ECU 150 can be set as appropriate, and a processor may be prepared for each predetermined control.

The timer 154 is configured to notify the processor 151 of the arrival of the set time. At the time set in the timer 154, the timer 154 transmits a signal for notifying the arrival of the set time to the processor 151. In the present embodiment, a timer circuit is adopted as the timer 154. However, the timer 154 may be realized by software, instead of hardware (timer circuit). Further, the ECU 150 can acquire the current time using a real-time clock (RTC) circuit (not shown) built in the ECU 150.

The vehicle 50 further includes a traveling drive unit 140, an input device 161, a meter panel 162, a navigation system (hereinafter referred to as "NAVI") 170, a communication instrument 180, and drive wheels W. The drive system of the vehicle 50 is not limited to the front wheel drive shown in FIG. 1, and may be rear wheel drive or four-wheel drive.

The traveling drive unit 140 includes a power control unit (PCU) and a motor generator (MG) (both not shown), and is configured to cause the vehicle 50 to travel using the electric power stored in the battery 130. The PCU is configured to include, for example, an inverter, a converter, and a relay (hereinafter referred to as a "system main relay (SMR)") (none of which are shown). The PCU is controlled by the ECU 150. The MG is, for example, a three-phase AC motor generator. The MG is driven by the PCU and is configured to rotate the drive wheels W. The PCU drives the MG using electric power supplied from the battery 130. Further, the MG is configured to generate regenerative power and supplies the generated electric power to the battery 130. The SMR is configured to switch connection and disconnection of the electric power path extending from the battery 130 to the MG. The SMR is closed (connected) when the vehicle 50 is traveling.

The input device 161 is a device that receives an input from a user. The input device 161 is operated by the user and outputs a signal corresponding to the operation by the user to the ECU 150. Examples of the input device 161 include various switches, various pointing devices, a keyboard, and a touch panel. The input device 161 may include a smart speaker that receives voice input.

The meter panel 162 is configured to display information related to the vehicle 50. The meter panel 162 displays various types of information related to the vehicle 50 measured by various sensors mounted on the vehicle 50, for example. The information displayed on the meter panel 162 may include at least one of the outside air temperature, the traveling speed of the vehicle 50, the SOC of the battery 130, the average electricity cost, and the mileage of the vehicle 50. The meter panel 162 is controlled by the ECU 150. The ECU 150 may display a message or a warning light for the user on the meter panel 162 when a predetermined condition is satisfied.

The NAVI 170 includes a processor, a storage device, a touch panel display, a global positioning system (GPS) module (none of which are shown). The storage device stores map information. The touch panel display receives an input from the user and displays maps and other information. The GPS module is configured to receive signals from GPS satellites (hereinafter referred to as "GPS signals"). The NAVI 170 can identify the position of the vehicle 50 using the GPS signals. The NAVI 170 is configured to perform a route search for finding a travel route (for example, the shortest route) from the current position of the vehicle 50 to the destination based on the input from the user, and display the travel route found by the route search on the map.

The communication instrument 180 includes various communication interfaces (I/Fs). The ECU 150 is configured to communicate with an EMS 60 (FIG. 3) that will be described later via the communication instrument 180. Further, the ECU 150 is configured to perform wireless communication with a server 30B (FIG. 3) that will be described later via the communication instrument 180.

Figure 2:
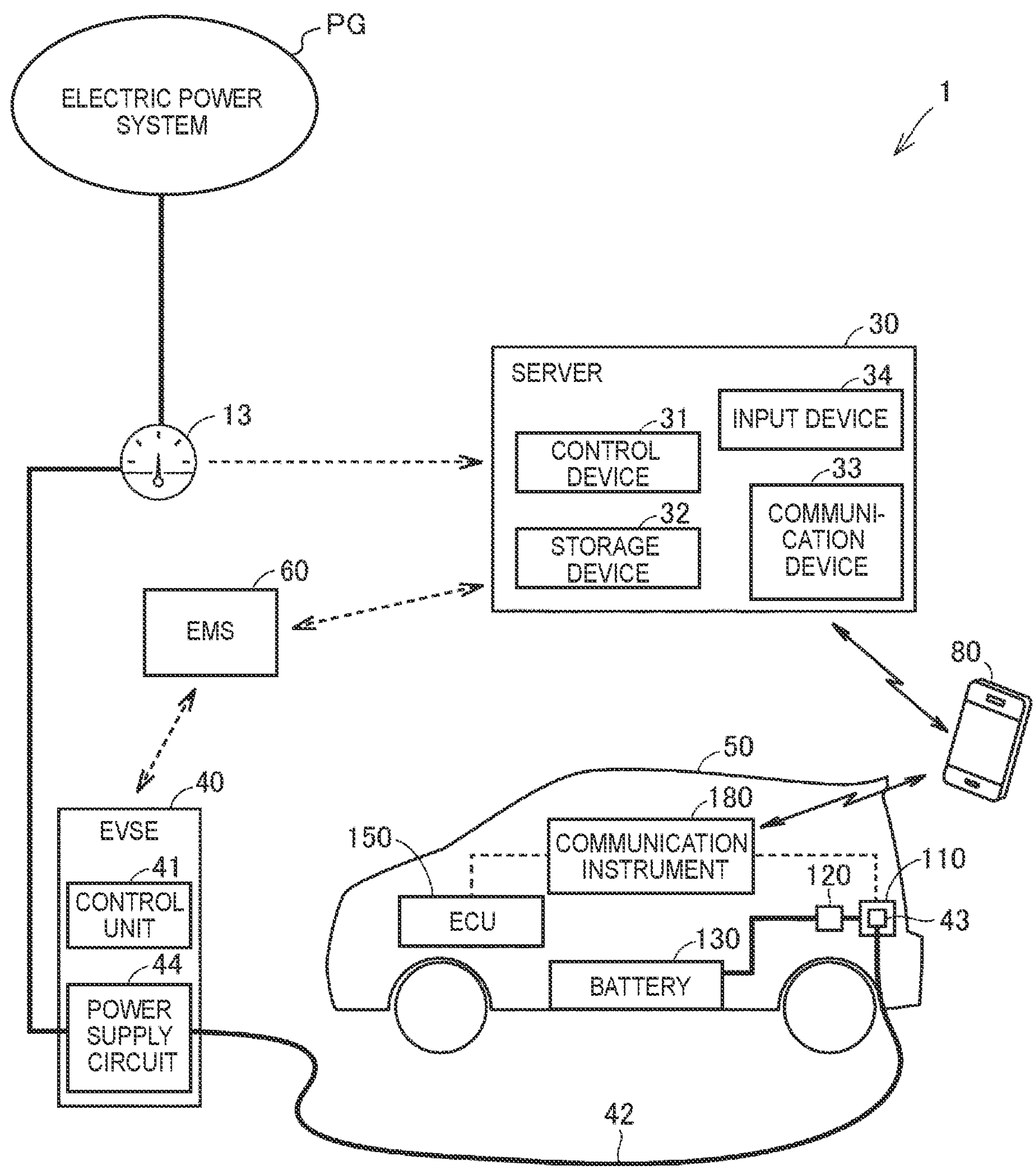
FIG. 2 is a diagram showing a communication mode of a server according to a first embodiment.

FIG. 2 is a diagram showing a communication mode of the server 30 according to a first embodiment. With reference to FIG. 2, an electric power management system 1 includes an electric power system PG, a server 30, the EVSE 40, the vehicle 50, and a mobile terminal 80. The electric power system PG and the server 30 according to the present embodiment correspond to an example of a "power network" and an example of a "server" according to the present disclosure, respectively.

The vehicle 50 has the configuration shown in FIG. 1. In the present embodiment, AC electric power supply equipment that provides AC electric power is adopted as the EVSE 40. The charger-discharger 120 is provided with a circuit compatible with the AC electric power supply equipment. However, the EVSE 40 is not limited to the above, and may be DC electric power supply equipment that provides DC electric power. The charger-discharger 120 may be provided with a circuit compatible with the DC electric power supply equipment.

The mobile terminal 80 corresponds to a mobile terminal carried by the user of the vehicle 50. In the present embodiment, a smartphone equipped with a touch panel display is adopted as the mobile terminal 80. However, the present disclosure is not limited to this, and any mobile terminal can be adopted as the mobile terminal 80, and a tablet terminal, a wearable device (for example, a smart watch), an electronic key, a service tool or the like can also be adopted.

The electric power system PG is an electric power network provided by an electricity business operator (for example, an electric power company). The electric power system PG is electrically connected to a plurality of sets of EVSE (including the EVSE 40), and supplies the AC electric power to each set of the EVSE. The power supply circuit 44 built in the EVSE 40 is controlled by the control unit 41 to convert the electric power supplied from the electric power system PG into electric power suitable for the external charging. The power supply circuit 44 may include a sensor for detecting the charging electric power.

In the vehicle 50 in the chargeable state, the relay of the charger-discharger 120 is closed such that the battery 130 is electrically connected to the electric power system PG. The external charging of the battery 130 is performed by supplying the electric power from the electric power system PG to the battery 130 via the power supply circuit 44, the charging cable 42, and the charger-discharger 120.

The server 30 does not communicate directly with the vehicle 50. That is, the server 30 does not wirelessly communicate with the vehicle 50. The server 30 communicates with the vehicle 50 via the EMS 60. The EMS 60 communicates with the vehicle 50 via the EVSE 40 in accordance with a command from the server 30. The communication instrument 180 mounted on the vehicle 50 is configured to communicate with the EVSE 40 via the charging cable 42. The communication method between the EVSE 40 and the vehicle 50 is any communication method, and may be, for example, controller area network (CAN) or power line communication (PLC). The standard for communication between the EVSE 40 and the vehicle 50 may be International Organization for Standardization (ISO)/International Electrotechnical Commission (IEC) 15118 or IEC 61851.

In the present embodiment, the communication instrument 180 and the mobile terminal 80 are configured to communicate wirelessly with each other. The communication between the communication instrument 180 and the mobile terminal 80 may be short-range communication (for example, direct communication in and around the vehicle) such as Bluetooth (registered trademark).

The server 30 is configured to be communicable with the mobile terminal 80. Predetermined application software (hereinafter, simply referred to as "application") is installed in the mobile terminal 80. The mobile terminal 80 is carried by the user of the vehicle 50, and can transmit and receive information to and from the server 30 through the above application. The user can operate the above application through, for example, the touch panel display of the mobile terminal 80. The user can transmit, for example, the scheduled departure time of the vehicle 50 to the server 30 by operating the above application.

The server 30 includes a control device 31, a storage device 32, a communication device 33, and an input device 34. The control device 31 includes a processor and a storage device, and is configured to execute predetermined information processing and control the communication device 33. The storage device 32 is configured to be able to store various types of information. The communication device 33 includes various communication I/Fs. The control device 31 is configured to communicate with the outside through the communication device 33. The input device 34 is a device that receives an input from the user. The input device 34 outputs the input from the user to the control device 31.

Figure 3:
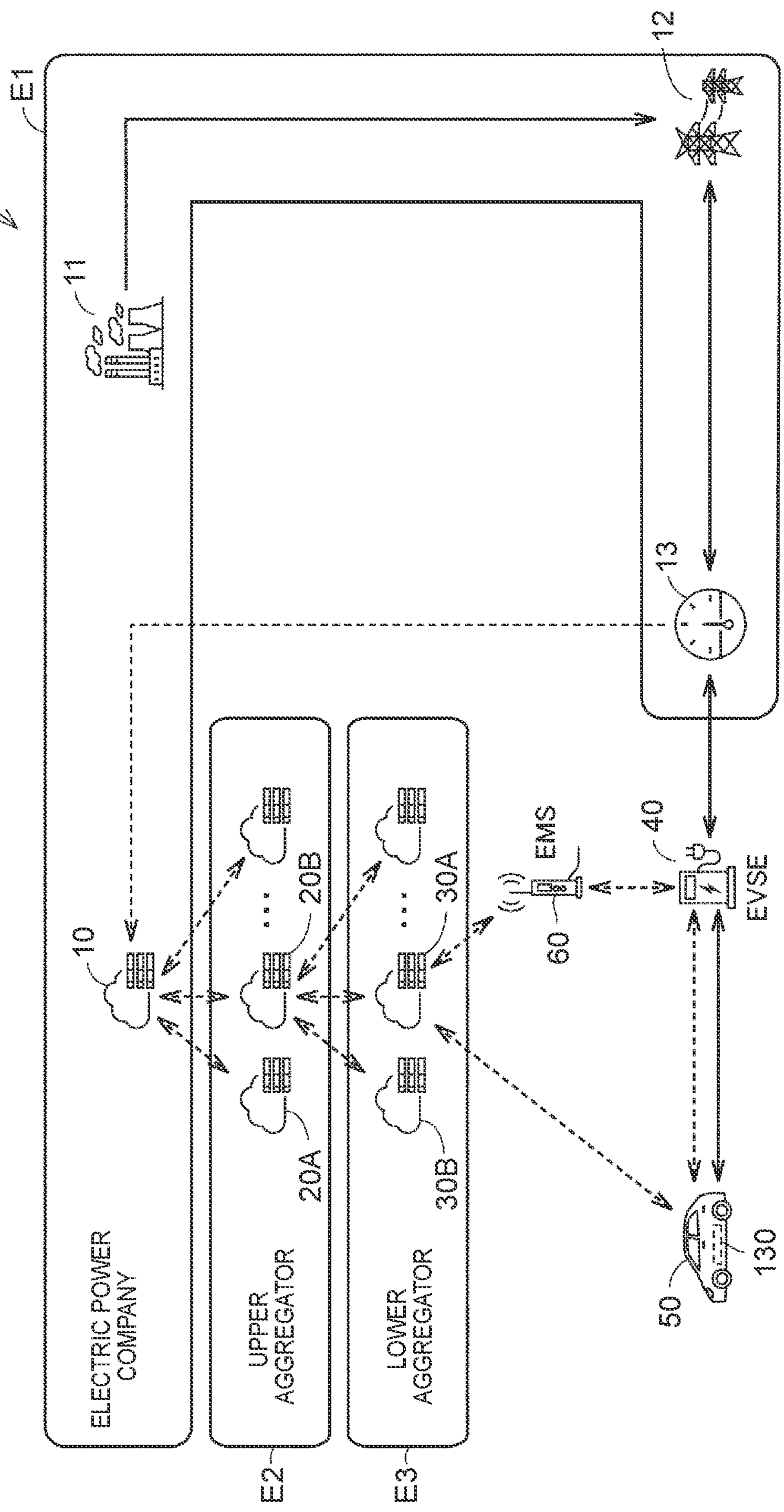
FIG. 3 is a diagram showing a schematic configuration of an electric power management system according to the present embodiment.

FIG. 3 is a diagram showing a schematic configuration of the electric power management system 1 according to the present embodiment. In the present embodiment, the electric power management system 1 functions as a virtual power plant (VPP). The VPP is a mechanism that bundles a large number of distributed energy resources (hereinafter, also referred to as "distributed energy resources (DER)") by advanced energy management technology using Internet of Things (IoT), and causes these DERs to function as if the DERs serve as a single power plant by remotely and integratedly controlling the DERs. In the electric power management system 1, the VPP is realized by energy management using an electrified vehicle (for example, the vehicle 50 shown in FIG. 1).

The electric power management system 1 is a vehicle grid integration (VGI) system. The electric power management system 1 includes a plurality of electrified vehicles and a plurality of sets of EVSE (only one for each is shown in FIG. 3). The number of electrified vehicles and the sets of EVSE included in the electric power management system 1 is independently arbitrary, and may be 10 or more, or 100 or more. The electric power management system 1 may include at least one of a POV and a MaaS vehicle. The POV is a personally owned vehicle. The MaaS vehicle is a vehicle managed by a mobility as a service (MaaS) business operator. The electric power management system 1 may include at least any one of non-public EVSE that can be used only by a specific user (for example, home EVSE) and public EVSE that can be used by an unspecified number of users. The mobile terminal 80 shown in FIG. 2 is carried by each user of the vehicle 50.

With reference to FIG. 2 and FIG. 3, the electric power management system 1 includes an electric power company E1, an upper aggregator E2 that contacts the electric power company E1, and a lower aggregator E3 that contacts the consumer.

The electric power company E1 also serves as an electric power generation business operator and an electric power transmission and distribution business operator. The electric power company E1 constructs an electric power network (that is, the electric power system PG shown in FIG. 2) by a power plant 11 and an electric power transmission and distribution facility 12, and maintains and manages the electric power system PG by a server 10. The power plant 11 is provided with an electric power generation device for generating electricity, and is configured to supply the electric power generated by the electric power generation device to the electric power transmission and distribution facility 12. An electric power generation method of the power plant 11 is any method. The electric power generation method of the power plant 11 may be any of thermal power generation, hydroelectric power generation, wind power generation, nuclear power generation, and solar power generation. The electric power transmission and distribution facility 12 includes a transmission line, a substation, and a distribution line, and is configured to transmit and distribute electric power supplied from the power plant 11.

A smart meter 13 is configured to measure electric power consumption every predetermined time (for example, every 30 minutes), store the measured electric power consumption, and transmit the measured electric power consumption to the server 10. The smart meter 13 is provided for each consumer (for example, an individual or a company) that uses electric power. The server 10 acquires the electric power consumption for each consumer from the smart meter 13 of each consumer. The electric power company E1 may receive an electricity bill in accordance with the electric power consumption from each consumer. In the present embodiment, the electric power company corresponds to a manager of the electric power system PG.

The electricity business operator that bundles the DERs and provides energy management services is referred to as an "aggregator". The electric power company E1 can adjust the electric power of the electric power system PG by cooperating with the aggregator, for example. The upper aggregator E2 includes a plurality of servers (for example, servers 20A, 20B). Each server included in the upper aggregator E2 belongs to a different business operator. The lower aggregator E3 includes a plurality of servers (for example, servers 30A, 30B). Each server included in the lower aggregator E3 belongs to a different business operator. Hereinafter, each server included in the upper aggregator E2 will be referred to as a "server 20", and each server included in the lower aggregator E3 will be referred to as a "server 30", except for the case where the servers will be described separately. The numbers of servers 20 and 30 are independent and arbitrary, and may be five or more, or 30 or more.

In the present embodiment, one server 10 requests energy management to a plurality of servers 20, and each server 20 requested by the server 10 requests energy management to a plurality of servers 30. Further, each server 30 requested by the server 20 requests energy management to a plurality of DER users. The electric power company E1 can request energy management to many consumers (for example, users of the vehicles 50) using the hierarchical structure above (tree structure). The request may be made by demand response (DR).

When the server 30 receives a request for energy management from the server 20, the server 30 selects the DER for responding to the request from the DERs registered in the server 30. The DER selected as described above will be also referred to as "EMDER" below.

The server 30 manages energy in a managed area. The area managed by the server 30 may be one city (for example, a smart city), a factory, or a university campus. The aggregator concludes a contract related to energy management with the DER user present in the managed area of the server 30. The user who has signed this contract can receive a predetermined incentive by causing the DER to perform energy management in accordance with the request from the aggregator. In addition, the user who approves to comply with the request but does not comply with the request is subject to a predetermined penalty based on the above contract. The DER and its users whose energy management is obliged by the contract are registered in the server 30.

After selecting the EMDER, the server 30 transmits a command to each EMDER. According to this command, energy management (for example, supply and demand adjustment of the electric power system PG) that complies with the request from the server 20 is performed.

The server 30 measures the electric energy adjustment amount for each EMDER (for example, the charge electric energy and/or the discharge electric energy in a predetermined period) by a predetermined watthour meter. The electric energy adjustment amount may be used to calculate the incentive. The predetermined watthour meter may be the smart meter 13 or a watthour meter mounted on the vehicle (for example, the monitoring module 121 shown in FIG. 1). The watthour meter may be installed at any location. The EVSE 40 may include a built-in watthour meter. The watthour meter may be attached to a portable charging cable.

In the present embodiment, the server 30 is configured to receive the detection value of the smart meter 13 from the server 10. However, the present disclosure is not limited to this, and the server 30 may be configured to directly acquire the detection value of the smart meter 13 (without intervening the server 10).

The smart meter 13 is configured to measure the electric energy supplied from the electric power system PG shown in FIG. 2 (that is, the electric power network constructed by the power plant 11 and the electric power transmission and distribution facility 12) to the EVSE 40. In the present embodiment, the EVSE 40 and the EMS 60 are installed in one residence or business establishment (for example, a factory or commercial facility). The EMS 60 is, for example, a home energy management system (HEMS), a factory energy management system (FEMS), or a building energy management system (BEMS). The smart meter 13 measures the electric energy supplied from the electric power system PG to the residence or business establishment (that is, the electric energy used in the residence or business establishment).

When the server 30 receives a request for energy management from the server 20, the server 30 performs energy management through charging of the battery 130 by transmitting a charge start command to the vehicle 50 via the EMS 60 and the EVSE 40. Further, the server 30 is configured to perform wireless communication with the vehicle 50.

In the electric power management system 1 described above, even when control of a charge-discharge amount to control the SOC of the battery 130 of the vehicle 50 within a range from an upper limit value to a lower limit value is applied to the VPP, the control does not enhance contribution to the VPP.

Therefore, the electric power management system 1 is a system that performs an exchange of electric power with the electric power system PG of the electric power company E1 that is a counterparty of the exchange of the electric power, and includes a plurality of the vehicles 50, each including the battery 130, and servers 10, 20, and 30 that manage the exchange of the electric power between the battery 130 of each of the vehicles 50 and the electric power system PG. The servers 10, 20, and 30 detect a predetermined operation of the user that correlates with termination of the exchange of the electric power between the battery 130 and the electric power system PG. When the predetermined operation is detected, the servers 10, 20, and 30 calculate the estimated time when the exchange of the electric power between the battery 130 and the electric power system PG is terminated based on the time when the predetermined operation is detected, and execute a process of distributing the electric power to be exchanged by the vehicle 50 in which the exchange of the electric power with the electric power system PG is estimated to be terminated at the calculated estimated time to another vehicle 50 that performs the exchange of the electric power with the electric power system PG.

With the above, the electric power to be exchanged by the vehicle 50 in which the exchange of the electric power between the battery 130 of the vehicle 50 and the electric power system PG of the electric power company E1 is estimated to be terminated at the estimated time that is calculated based on the time when the predetermined operation of the user that correlates with termination of the exchange of the electric power is detected is distributed to the other vehicle 50. As a result, it is possible to suppress fluctuations in the exchanged electric power due to the unplanned leaving of the vehicle 50 during the exchange of the electric power with the electric power company E1.

Figure 4:
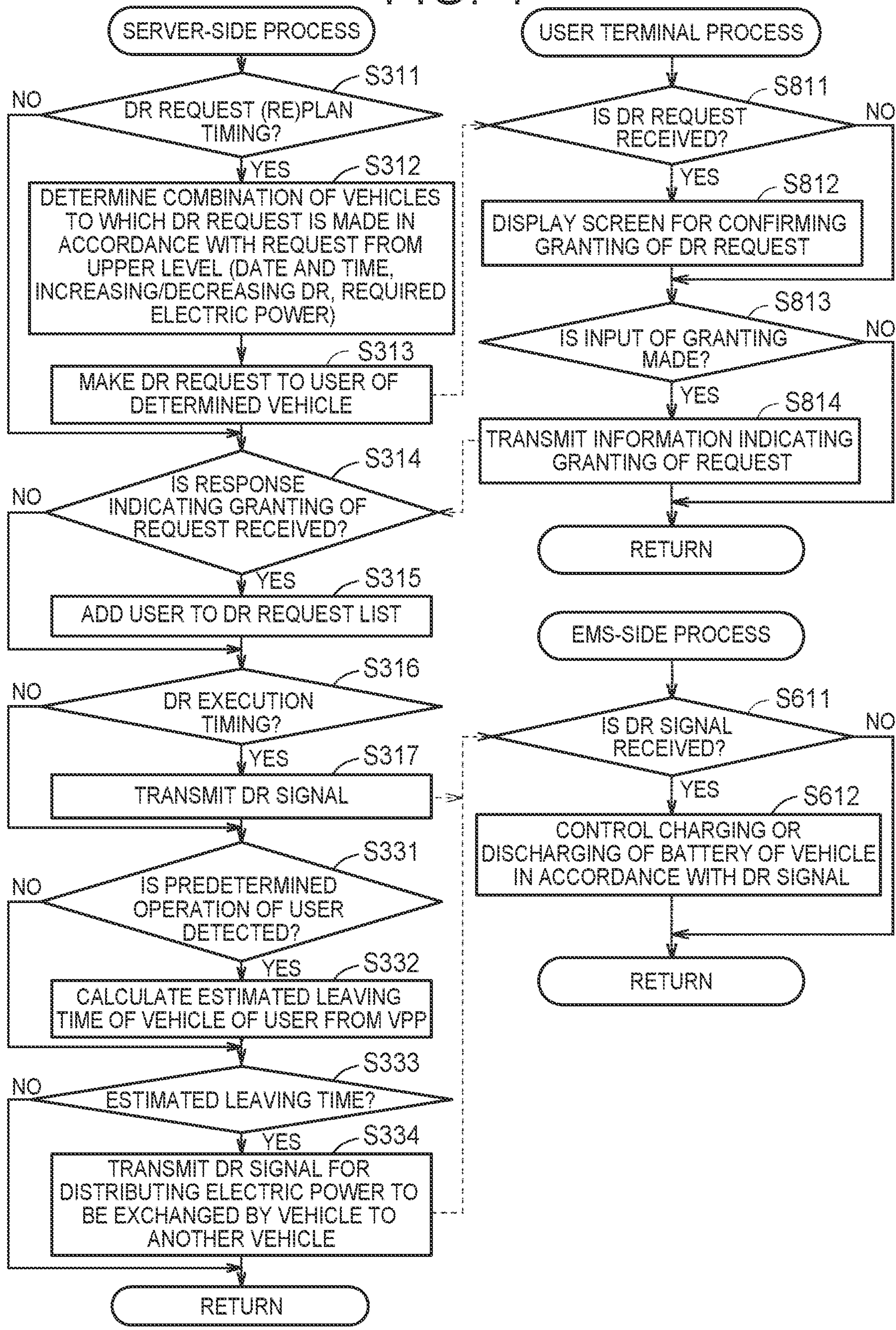
FIG. 4 is a flowchart showing the flow of processes for a virtual power plant (VPP) in the present embodiment.

FIG. 4 is a flowchart showing the flow of processes for the VPP in the present embodiment. With reference to FIG. 4, a server-side process is called and executed at predetermined intervals from an upper-level process executed by the control device 31 of the server 30. In the server-side process, first, the control device 31 of the server 30 determines whether the current time is the timing to plan or replan a DR request (step S311). The timing to plan the DR request is, for example, the timing when the DR request is received from the upper aggregator E2. The timing to replan the DR request is the timing when the control device 31 determines that the planned DR request is not granted as planned.

When the control device 31 of the server 30 determines that it is the timing to (re)plan the DR request (YES in step S311), the control device 31 determines a combination of the vehicles to which the DR request is made in accordance with the DR request from the upper level, such as the upper aggregator E2 (step S312). Information included in the DR request includes, for example, information indicating the date and time when the DR is performed, information indicating the distinction between an increasing DR and a decreasing DR, and information indicating the electric power required by the DR.

The DR request from the upper level is, for example, a first request example to suppress a demand for 15 megawatts (MW) by the decreasing DR during 1:00 pm to 3:00 pm on Mondays to Fridays from July to August, or a second request example to increase a demand for 9 (MW) by the increasing DR during 0:00 am to 5:00 am on Mondays to Fridays from January to February.

For example, in the case of the first request example, when an average 10(%) of all of the vehicles can participate in the DR and each vehicle can supply the electric power of average 1.5 (kilowatts (kW) per vehicle), a combination of the vehicles is determined by an equation as 15 (MW)/1.5 (kW per vehicle)/10(%)=100.000 (vehicles). With the above, it is possible to supply the electric power of 15 (MW) with 10% of 100,000 vehicles 50, and suppression of the demand for 15 (MW) can be predicted.

Further, in the case of the second request example, when each vehicle can be charged with the electric power of average 3.0 (kW per vehicle), a combination of the vehicles is determined by an equation as 9 (MW)/3.0 (kW per vehicle)/10(%)=30,000 (vehicles). With the above, it is possible to consume the electric power of 9 (MW) with 10% of 30,000 vehicles 50, and an increase in the demand for 9 (MW) can be predicted.

Next, the control device 31 of the server 30 transmits information for making the DR request to the mobile terminal 80 of the user of the vehicle 50 determined in step S312 (step S313). The information for making the DR request includes, for example, the information indicating the date and time when the DR is performed, the information indicating the distinction between the increasing DR and the decreasing DR, and information indicating the electric power per vehicle 50 required by the DR.

A user terminal process is called and executed at predetermined intervals from an upper-level process executed by the CPU of the mobile terminal 80 in a VPP application. In the mobile terminal 80, the CPU of the mobile terminal 80 determines whether the information for making the DR request is received from the server 30 by the VPP application executed in the background (step S811). When the CPU of the mobile terminal 80 determines that the DR request is received (YES in step S811), the CPU displays a screen on the display for confirming whether to grant the DR request (step S812). The screen for confirming whether to grant the DR request displays, for example, a button image for inputting the intention of granting.

When the CPU of the mobile terminal 80 determines that the DR request is not received (NO in step S811), or after step S812, the CPU determines whether the input to grant the DR request is made as the user taps the button image for inputting the intention of granting on the screen for confirming whether to grant the DR request (step S813).

When the CPU of the mobile terminal 80 determines that the input of granting is made (YES in step S813), the CPU transmits, to the server 30, information indicating that the DR request is granted (step S814). When the CPU of the mobile terminal 80 determines that the input of granting is not made (NO in step S813), or after step S814, the CPU returns the process to be executed to the upper-level process of the caller of the present user terminal process.

The control device 31 of the server 30 determines whether a response indicating that the DR request is granted is received from the mobile terminal 80 (step S314). When the control device 31 of the server 30 determines that the response indicating that the DR request is granted is received (YES in step S314), the control device 31 adds information related to the user of the mobile terminal 80 from which the response is transmitted to a list of users who grant the DR request (step S315).

When the required number of users for securing the electric power required by the DR is not included in the DR request list by the predetermined period before the date and time when the DR indicated by the DR request from the upper level is performed, the control device 31 of the server 30 executes the processes in steps S311 to S313 again.

When the control device 31 of the server 30 determines that the response indicating that the DR request is granted is not received (NO in step S314), or after step S315, the control device 31 determines whether the current time is the timing to execute the DR indicated in the DR request (step S316).

When the control device 31 of the server 30 determines that the current time is the timing to execute the DR (YES in step S316), a DR signal for starting execution of the DR is transmitted to the mobile terminal 80 of the user included in the DR request list (step S317). The DR signal includes, for example, information indicating the upper and lower limit values of the SOC control range of the battery 130 of the vehicle 50 at the time of participation in the VPP, information indicating the date and time when the DR is started, the information indicating the distinction between the increasing DR and the decreasing DR, and the information indicating the electric power per vehicle 50 required by the DR.

The user who has granted the DR request connects the connector 43 of the EVSE 40 designated in advance to the vehicle 50 to enable charging and discharging before the timing to execute the DR is reached.

An EMS-side process is called and executed at predetermined intervals from an upper-level process executed by the CPU of the EMS 60. In the EMS-side process, the CPU of the EMS 60 determines whether the DR signal is received from the server 30 (step S611). When the CPU of the EMS 60 determines that the DR signal is received (YES in step S611), the CPU controls the EVSE 40 and the vehicle 50 to execute charging and discharging of the battery 130 of the vehicle 50 in accordance with the DR signal (step S612). The server 30 acquires the charge-discharge electric power of the battery 130 of the vehicle 50 from the smart meter 13.

For example, when the DR distinction indicated by the DR signal is the decreasing DR, the EMS 60 transmits, to the EVSE 40 and the vehicle 50, a signal for starting charging of the vehicle 50 with the wattage of the electric power indicated by the DR signal. With the above, the EVSE 40 starts charging of the vehicle 50 with the specified electric power. As a result, with charging of the vehicle 50, it is possible to execute the decreasing DR by the specified electric power. In addition, when the SOC of the battery 130 reaches the upper limit value of the SOC indicated by the DR signal, control is executed to prohibit charging.

Further, when the DR distinction indicated by the DR signal is the increasing DR, the EMS 60 transmits, to the EVSE 40 and the vehicle 50, a signal for starting discharging from the vehicle 50 with the wattage of the electric power indicated by the DR signal. With the above, the EVSE 40 starts discharging from the vehicle 50 with the specified electric power. As a result, with discharging from the vehicle 50, it is possible to execute the increasing DR by the specified electric power. In addition, when the SOC of the battery 130 reaches the lower limit value of the SOC indicated by the DR signal, control is executed to prohibit discharging.

When the DR distinction indicated by the DR signal is the increasing DR and the vehicle 50 is charged until immediately before the DR execution timing, the EMS 60 may transmit, to the EVSE 40 and the vehicle 50, a signal for reducing the charging electric power to the vehicle 50 by the wattage of the electric power indicated by the DR signal. With the above, it is possible to continue charging of the vehicle 50 with the electric power obtained by reducing the electric power specified by the DR signal from the charging electric power to the vehicle 50 using the EVSE 40. As a result, with reduction of the charging electric power to the vehicle 50, it is possible to execute the increasing DR by the specified electric power.

When the CPU of the EMS 60 determines that the DR signal is not received (NO in step S611), or after step S612, the CPU returns the process to be executed to the upper-level process of the caller of the EMS-side process.

When the control device 31 of the server 30 determines that the current time is not the DR execution timing (NO in step S316), the control device 31 of the server 30 determines whether the predetermined operation of the user is detected (step S331). The predetermined operation of the user is, in the present embodiment, an unlocking operation of the door of the vehicle 50. The unlocking operation of the door is detected as the ECU 150 of the vehicle 50 receives an operation signal of an unlock button from the smart key of the vehicle 50. The control device 31 may detect that the predetermined operation is any of a plurality of types of operations.

When the control device 31 of the server 30 determines that the predetermined operation is detected (YES in step S331), the control device 31 calculates the estimated time when the vehicle 50 of the user leaves the VPP and stores the calculated estimated time in the storage device 32 (step S332). A required period for leaving from when the user performs the predetermined operation until when the vehicle 50 leaves the VPP can be stored in advance in the storage device 32 of the server 30 by statistical or artificial intelligence (AI) learning, for example. The estimated time when the vehicle 50 of the user leaves the VPP can be calculated by adding the required period for leaving corresponding to the predetermined operation to the time when the user performs the predetermined operation.

When the control device 31 of the server 30 determines that the predetermined operation of the user is not detected (NO in step S331), or after step S332, the control device 31 determines whether the current time reaches the estimated leaving time stored in the storage device 32 in step S332 (step S333).

When the control device 31 of the server 30 determines that the current time reaches the estimated leaving time (YES in step S333), the control device 31 distributes the electric power to be exchanged by the leaving vehicle 50 to another vehicle 50, transmits, to the other vehicle 50, a DR signal indicating the electric power obtained by adding the distributed electric power to the electric power that is originally exchanged by the other vehicle 50, and transmits, to the leaving vehicle 50, a DR signal indicating that the electric power to be exchanged by the leaving vehicle 50 is 0 (step S334). The EMS 60 that receives these updated DR signals executes the processes in steps S611 and S612 described above.

Second Embodiment

In the first embodiment, as shown in FIG. 2, the server 30 is configured to transmit a charge-discharge start command to the EMS 60 that manages the EVSE 40 to which the vehicle 50 is connected. In a second embodiment, the server 30 is configured to transmit the charge-discharge start command to the EVSE 40 without intervening the EMS 60.

Figure 5:
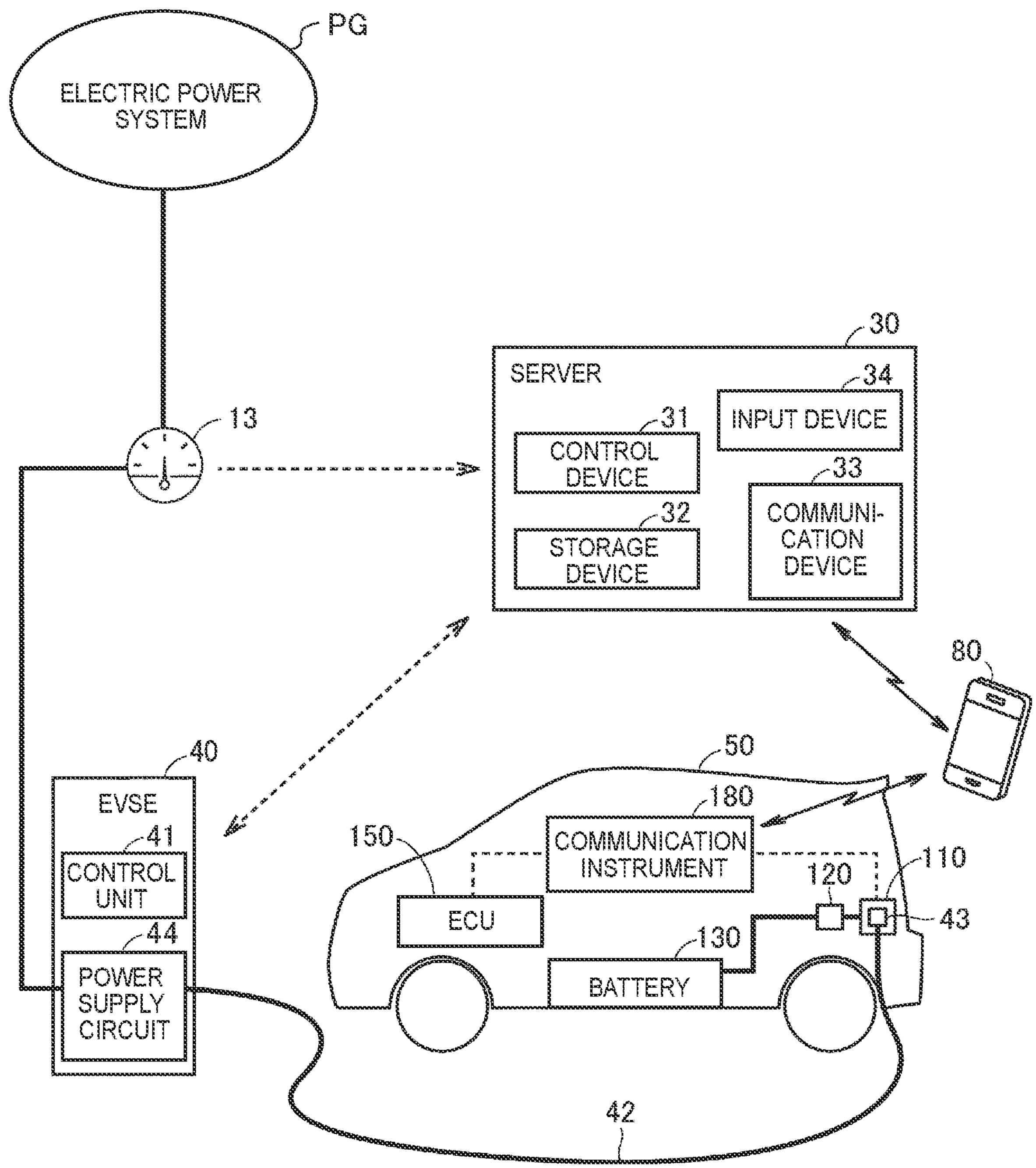
FIG. 5 is a diagram showing a communication mode of a server according to a second embodiment.

FIG. 5 is a diagram showing a communication mode of the server 30 according to the second embodiment. With reference to FIG. 5, the server 30 is configured to transmit the charge start command directly to the EVSE 40. The communication device 33 of the server 30 is configured to be communicable with the EVSE 40. Further, the EVSE 40 includes a communication device (not shown) for communicating with the server 30. The communication device of the EVSE 40 may be mounted on the main body of the EVSE 40 or may be provided on the charging cable 42. The communication method between the server 30 and the EVSE 40 may be wired or wireless.

In the first embodiment, in step S317 and step S334 shown in FIG. 4, the control device 31 of the server 30 transmits the DR signal to the EMS 60, and the CPU of the EMS 60 controls the EVSE 40 and the vehicle 50 such that charging or discharging of the battery 130 of the vehicle 50 is executed in accordance with the DR signal.

In the second embodiment, in step S317 and step S334 shown in FIG. 4, the control device 31 of the server 30 transmits the DR signal to the EVSE 40, and the control unit 41 of the EVSE 40 controls the power supply circuit 44 of the EVSE 40 and the vehicle 50 such that charging or discharging of the battery 130 of the vehicle 50 is executed in accordance with the DR signal.

Note that, the EVSE 40 may be configured to be communicable with an EVSE management cloud. The communication protocol between the EVSE 40 and the EVSE management cloud may be open charge point protocol (OCPP).

Third Embodiment

In the first embodiment, as shown in FIG. 2, the server 30 is configured to transmit a charge-discharge start command to the EMS 60 that manages the EVSE 40 to which the vehicle 50 is connected. In a third embodiment, the server 30 is configured to transmit the charge-discharge start command directly to the vehicle 50 without intervening the EMS 60 or the EVSE 40.

Figure 6:
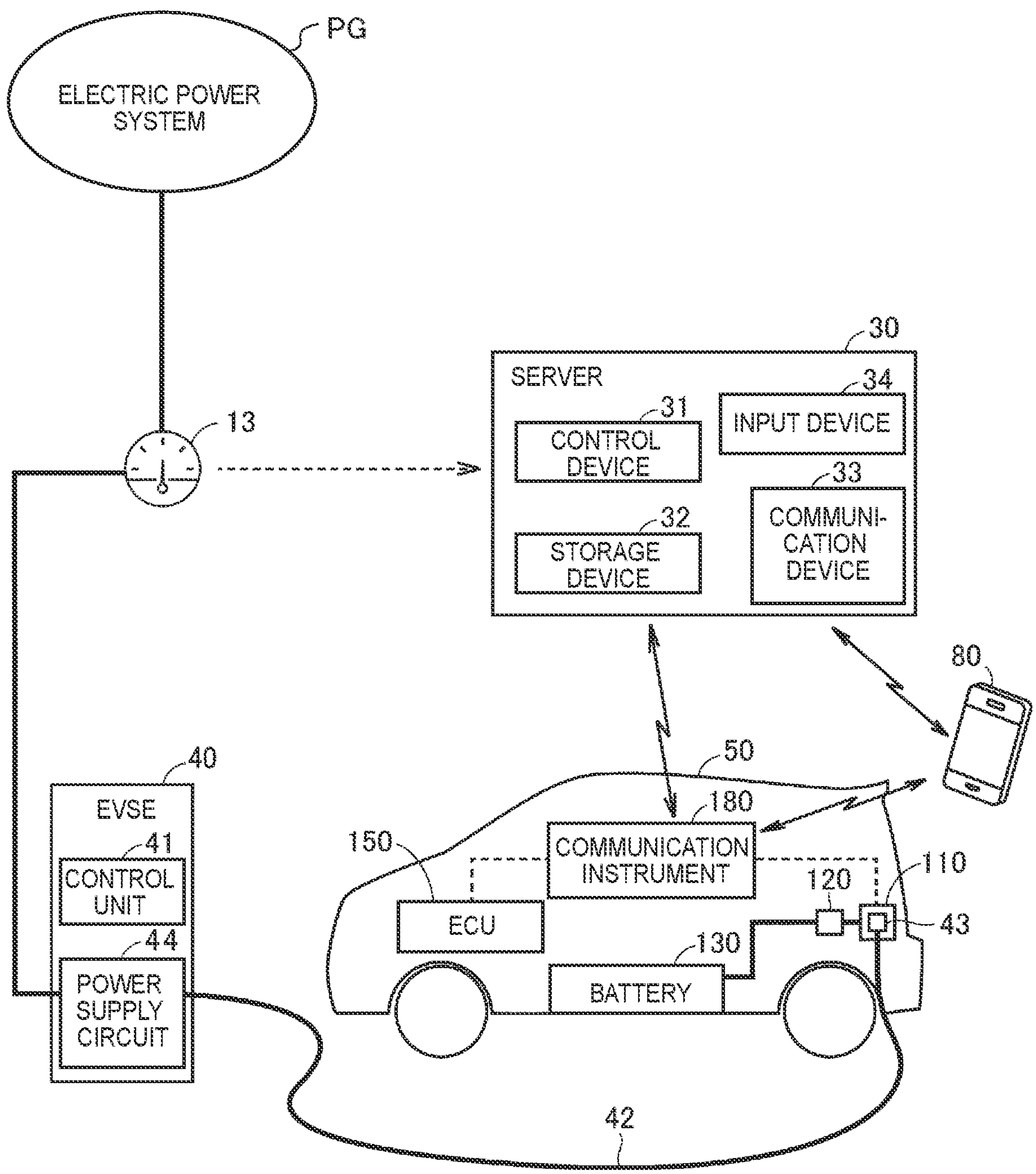
FIG. 6 is a diagram showing a communication mode of a server according to a third embodiment.

FIG. 6 is a diagram showing a communication mode of the server 30 according to the third embodiment. With reference to FIG. 6, the server 30 is configured to transmit the charge start command directly to the vehicle 50 via wireless communication. The server 30 includes the communication device 33 for performing wireless communication with the vehicle 50. Further, the communication instrument 180 of the vehicle 50 includes a communication I/F for communicating with the server 30. The communication instrument 180 may include a data communication module (DCM).

In the first embodiment, in step S317 and step S334 shown in FIG. 4, the control device 31 of the server 30 transmits the DR signal to the EMS 60, and the CPU of the EMS 60 controls the EVSE 40 and the vehicle 50 such that charging or discharging of the battery 130 of the vehicle 50 is executed in accordance with the DR signal.

In the third embodiment, in step S317 and step S334 shown in FIG. 4, the control device 31 of the server 30 transmits the DR signal to the vehicle 50, and the ECU 150 of the vehicle 50 controls the EVSE 40 and the charger-discharger 120 of the vehicle 50 such that charging or discharging of the battery 130 of the vehicle 50 is executed in accordance with the DR signal.

Other Modifications (1) In the above-described embodiments, the counterparty of the exchange of the electric power of the electric power management system 1 is the electric power company E1 as shown in FIG. 3. However, the counterparty of the exchange of the electric power is not limited to the electric power company such as a general electric power transmission and distribution business operator and a retail electricity business operator, and may be a renewable energy electric power generation business operator, or may be a consumer such as a factory, a building, or a household.

(2) In the above-described embodiments, the electric system of the counterparty of the exchange of the electric power is the electric power system PG that is an electric power network constructed by the power plant 11 and the electric power transmission and distribution facility 12, as shown in FIGS. 2 and 3. However, the electric system of the counterparty of the exchange of the electric power is not limited to this, and may be an electric power generation system of renewable energy such as a wind generator, a solar cell or a biomass power plant, a power grid, electric power storage equipment, or electric power transmission and reception equipment, may be electric equipment such as an electric device, electric power storage equipment, or electric power transmission and reception equipment at a factory, a building or a household, or may be a stationary battery.

(3) In the above-described embodiments, the server that manages the exchange of electric power between the battery 130 of each of the vehicles 50 and the electric system is the server 30 of the lower aggregator E3. However, the server is not limited to the server 30, and may be the server of the upper aggregator E2, may be the server 10 of the electric power company E1, or may be configured as an appropriate combination of the servers 10, 20, and 30.

(4) In the above-described embodiments, the main entities including the servers 10, 20, and 30 are the electric power company E1, the upper aggregator E2, and the lower aggregator E3, and the three parties are separate main entities. However, the present disclosure is not limited to this, and any of the servers 10, 20, and 30 may be provided in the same entity.

(5) In the above-described embodiments, the vehicle 50 is a movable machine equipped with an electric power storage device. However, the vehicle 50 is not limited to this, and other machines such as a drone and other flyable machines may be used as the vehicle 50.

(6) In the above-described embodiments, the vehicle 50 is a battery electric vehicle (BEV). However, the vehicle 50 is not limited to this. The vehicle 50 only needs to be a vehicle provided with the inlet 110 for exchanging the electric power with the outside and an electric power storage device such as the battery 130. For example, the vehicle 50 may be a plug-in hybrid electric vehicle (PHEV).

(7) In the above-described embodiments, the charging and discharging equipment is the EVSE 40. However, the charging and discharging equipment is not limited to this. The charging and discharging equipment may be other equipment as long as the charging and discharging equipment can charge or discharge the vehicle 50 or the like. The charging and discharging equipment may be quick charging equipment such as that installed in a charging stand or ordinary charging equipment, may be charging equipment installed at home, or may be a charging cable that can be connected to an outlet such as a household outlet.

(8) In the above-described embodiments, the predetermined operation of the user detected in step S331 in FIG. 4 is the unlocking operation of the door of the vehicle 50. However, the predetermined operation of the user is not limited to the above. The predetermined operation of the user may be other operations as long as the predetermined operation is the operation of the user that correlates with termination of the exchange of the electric power between an electric power storage device, such as the battery 130 of the vehicle 50, and an electric system, such as the electric power system PG, of a counterparty of the exchange of the electric power, such as the electric power company E1, in the VPP. The predetermined operation of the user may be a predetermined operation performed on the vehicle 50, or may be an operation performed on a predetermined object until the user reaches the vehicle 50.

The predetermined operation performed on the vehicle 50 is not limited to the unlocking operation of the door of the vehicle 50, and may be, for example, an unlocking operation of the inlet 110 of the vehicle 50 to which the connector 43 of the EVSE 40 is connected, approaching of the smart key possessed by the user to the vehicle 50 (an operation performed by the vehicle 50 to detect approaching of the smart key to the corresponding vehicle 50), or may be an operation to start traveling of the vehicle 50 (for example, an operation to unfold the side mirror, an operation to turn on a start switch of the vehicle 50, and an operation to open the door). These operations are detected when the ECU 150 receives signals from sensors that detect the operations of operation targets of each vehicle.

The operation performed on the predetermined object until the user reaches the vehicle 50 may be, for example, a locking operation of the front door of user's home, a locking operation of the window of user's home, regular operations of home appliances before the user leaves home (for example, turning off the ceiling light, turning on and off the dryer, and turning on and off the coffee maker), an operation to detect the user by a camera capable of capturing images of the inside of the building such as user's home or workplace or the vicinity of the vehicle 50, an operation to detect a voice indicating that the user departs using the vehicle 50 by a smart speaker or the like, or an operation to detect an input made by the user via a terminal such as a smartphone, indicating that the user departs using the vehicle 50. These operations can be configured to be detectable by the EMS 60, such as HEMS or BEMS, or a terminal such as the smartphone of the user.

(9) In the above-described embodiments, as shown in steps S333, S334, S611, and S612 in FIG. 4, when the current time reaches the estimated leaving time, a distribution process is executed to distribute the electric power to be exchanged by the vehicle 50 in which the exchange of the electric power with the electric power system PG is estimated to be terminated to the other vehicle 50 that exchanges the electric power with the electric power system PG. However, the timing is not limited to the above, and the timing to execute the distribution process may be another timing, and may be a timing a predetermined period prior to the timing when the current time reaches the estimated leaving time, or may be a timing at which the predetermined operation is detected.

(10) In the above-described embodiments, as shown in step S332 in FIG. 4, the required period for leaving is stored in the storage device 32 of the server 30 in advance by statistical or AI learning, for example. The required period for leaving may be the same value for all users registered in the server 30, or may be a different value for each user, for example, a value leaned for each user by AI learning.

(11) In the above-described embodiments, as shown in step S331 in FIG. 4, the detected predetermined operation is one predetermined operation. However, the predetermined operation is not limited to the above, and the predetermined operation to be detected may be a plurality of types of predetermined operations. In this case, the estimated time when the vehicle 50 of the user leaves the VPP is calculated by adding the required period for leaving corresponding to the detected type of predetermined operation to the time when the predetermined operation of the user is detected.

Further, the predetermined operation to be detected may be a combination of a plurality of types of predetermined operations, and may be, for example, a combination of an operation to lock the front door and an operation of the user to approach the vehicle 50. In this case, the estimated time when the vehicle 50 of the user leaves the VPP is calculated by adding the required period for leaving corresponding to the detected combination or the latest predetermined operation to the time when the predetermined operation is detected that is latest among the times when the predetermined operations included in the combination are detected.

(12) In the above-described embodiments, as shown in steps S333, S334, S611, and S612 in FIG. 4, when the current time reaches the estimated leaving time, the above-mentioned distribution process of the electric power is executed, regardless of whether the connector 43 of the EVSE 40 is actually disconnected from the inlet 110 of the vehicle 50.

However, execution of the distribution process is not limited to the above. The distribution process of the electric power may be executed when the connector 43 is disconnected from the inlet 110 during the period from the time a predetermined first period (for example, 1 minute, 5 minutes) prior to the estimated leaving time to the time a predetermined second period (for example, 5 minutes, 10 minutes) after the estimated leaving time. The predetermined first period and the predetermined second period are predetermined periods determined in advance corresponding to the predetermined operation. Note that, in this case, when the connector 43 is not disconnected from the inlet 110 even after the predetermined second period from the estimated leaving time, the distribution process may not be executed.

In addition, monitoring of disconnection of the connector 43 from the inlet 110 may be started from the time the predetermined first period prior to the estimated leaving time, and the distribution process may be executed immediately when the disconnection of the connector 43 is detected. Processes that can be executed in advance, such as calculation of distribution of the electric power to each vehicle 50 in the distribution process, may be executed before the connector 43 is disconnected. Further, when the disconnection of the connector 43 is not detected by the time the predetermined second period after the estimated leaving time, monitoring of the disconnection of the connector 43 from the inlet 110 may be terminated.

Further, monitoring of the unlocking operation of the connector 43 by the user may be started from the time the predetermined first period prior to the estimated leaving time, and the distribution process may be executed when the unlocking operation of the connector 43 is detected. Further, monitoring of the unlocking operation of the connector 43 by the user may be started from the time the predetermined first period prior to the estimated leaving time, the estimated leaving time may be calculated again as in step S332 when the unlocking operation of the connector 43 is detected, and the distribution process may be executed at the calculated estimated leaving time.

(13) In the above-described embodiments, as shown in steps S333, S334, S611, and S612 in FIG. 4, when the current time reaches the estimated leaving time, the above-mentioned distribution process of the electric power is executed, regardless of whether the connector 43 of the EVSE 40 is actually disconnected from the inlet 110 of the vehicle 50. In this case, when the connecter 43 is detected that the connector 43 is not disconnected from the inlet 110 even after the predetermined period (for example, 10 minutes) from when the distribution process is executed, the exchanging state of the electric power of each vehicle 50 may be returned to the state before the distribution process is executed.

(14) The above-described embodiments can be regarded as the disclosure of an electric power management system such as the electric power management system 1, can be regarded as the disclosure of an electric power management server such as the servers 10, 20, and 30 that manage the exchange of electric power, can be regarded as the disclosure of the vehicle 50 included in the electric power management system 1, and can be regarded as the disclosure of an electric power management method or an electric power management program in the electric power management system 1.

SUMMARY (1) As shown in FIGS. 1 to 3, and 6, the electric power management system 1 is a system that performs an exchange of electric power with the electric power system PG of the electric power company E1 that is a counterparty of the exchange of the electric power, and includes a plurality of the vehicles 50, each including the battery 130, and the servers 10, 20, and 30 that manage the exchange of the electric power between the battery 130 of each of the vehicles 50 and the electric power system PG. As shown in FIGS. 1 to 6, the servers 10, 20, and 30 detect the predetermined operation of the user that correlates with termination of the exchange of the electric power between the battery 130 and the electric power system PG (for example, in step S331 in FIG. 4). When the predetermined operation is detected, the servers 10, 20, and 30 calculate the estimated time when the exchange of the electric power between the battery 130 and the electric power system PG is terminated based on the time when the predetermined operation is detected (for example, step S332 in FIG. 4), and execute a process of distributing the electric power to be exchanged by the vehicle 50 in which the exchange of the electric power with the electric power system PG is estimated to be terminated at the calculated estimated time to another vehicle 50 that exchanges the electric power with the electric power system PG (for example, steps S333, S334, S611, and S612).

With the above, the electric power to be exchanged by the vehicle 50 in which the exchange of the electric power between the battery 130 of the vehicle 50 and the electric power system PG of the electric power company E1 is estimated to be terminated at the estimated time that is calculated based on the time when the predetermined operation of the user that correlates with termination of the exchange of the electric power is detected is distributed to the other vehicle 50. As a result, it is possible to suppress fluctuations in the exchanged electric power due to the unplanned leaving of the vehicle 50 during the exchange of the electric power with the electric power company E1.

(2) As shown in step S331 in FIG. 4 and (8) of the other modifications, the predetermined operation may be a predetermined operation performed on the vehicle 50.

With the above, it is possible to suppress fluctuations in the exchanged electric power due to unplanned leaving of the vehicle 50 triggered by the predetermined operation performed on the vehicle 50.

(3) As shown in step S331 in FIG. 4 and (8) of the other modifications, the predetermined operation may be an operation performed on a predetermined object until the user reaches the vehicle 50.

With the above, it is possible to suppress fluctuations in the exchanged electric power due to unplanned leaving of the vehicle 50 triggered by the operation performed on the predetermined object until the user reaches the vehicle 50.

(4) As shown in step S317 and step S612 in FIG. 4, the exchange of the electric power between the battery 130 of the vehicle 50 and the electric power system PG of the electric power company E1 may be to supply the electric power from the battery 130 to the electric power system PG.

With the above, when the electric power is supplied from the battery 130 of the vehicle 50 to the electric power system PG of the electric power company E1, fluctuations in the exchanged electric power due to unplanned leaving of the vehicle 50 can be suppressed.

(5) As shown in step S317 and step S612 in FIG. 4, the exchange of the electric power between the battery 130 of the vehicle 50 and the electric power system PG of the electric power company E1 may be to reduce supply of the electric power from the electric power system PG to the battery 130.

With the above, when the supply of the electric power from the electric power system PG of the electric power company E1 to the battery 130 of the vehicle 50 is reduced, fluctuations in the exchanged electric power due to unplanned leaving of the vehicle 50 can be suppressed.

(6) As shown in step S317 and step S612 in FIG. 4, the exchange of the electric power between the battery 130 of the vehicle 50 and the electric power system PG of the electric power company E1 may be to increase supply of the electric power from the electric power system PG to the battery 130.

With the above, when the supply of the electric power from the electric power system PG of the electric power company E1 to the battery 130 of the vehicle 50 is increased, fluctuations in the exchanged electric power due to unplanned leaving of the vehicle 50 can be suppressed.

It is also planned that the embodiments disclosed herein will be implemented in combination as appropriate. The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. An electric power management system configured to perform an exchange of electric power between an electric power storage device and an electric system of a counterparty of the exchange of the electric power, the electric power management system comprising:

a plurality of vehicles, each including the electric power storage device; and a server including a processor, wherein the processor is configured to detect a predetermined operation of a user that correlates with termination of the exchange of the electric power, calculate an estimated time for the termination of the exchange of the electric power in a case where the predetermined operation is detected, wherein the estimated time is calculated by adding a required period for a vehicle to leave a virtual power plant to a time when the predetermined operation is detected, and the required period is stored in the server in advance, and distribute the electric power to be exchanged by the vehicle in which the exchange of the electric power is estimated to be terminated at the calculated estimated time to another vehicle that exchanges the electric power with the electric system.

2. The electric power management system according to claim 1, wherein the predetermined operation is a predetermined operation performed on the vehicle.

3. The electric power management system according to claim 2, wherein the predetermined operation performed on the vehicle is at least one of unlocking a door of the vehicle, unlocking an inlet of the vehicle to which a connector of electric vehicle supply equipment is connected, an operation performed by the vehicle to detect a smart key to the vehicle approaching, unfolding a side mirror, turning on a start switch of the vehicle, and an operation to open the door.

4. The electric power management system according to claim 1, wherein the predetermined operation is an operation performed on a predetermined object until the user reaches the vehicle.

5. The electric power management system according to claim 4, wherein the operation performed on the predetermined object until the user reaches the vehicle is at least one of locking a front door of a house of the user, locking a window of the house, turning off a ceiling light in the house, turning on and off a dryer in the house, turning on and off a coffee maker in the house, an operation to detect the user by a camera configured to capture images of an inside of the house, an inside of a building of workplace of the user, or an inside of a predetermined area of the vehicle, detecting, by a smart speaker, a voice indicating that the user departs using the vehicle from a place where the vehicle is parked, and detecting an input made by the user via a terminal indicating that the user departs using the vehicle from the place where the vehicle is parked.

6. The electric power management system according to claim 1, wherein the exchange of the electric power between the electric power storage device of the vehicle and the electric system of the counterparty is to supply the electric power from the electric power storage device to the electric system.

7. The electric power management system according to claim 1, wherein the exchange of the electric power between the electric power storage device of the vehicle and the electric system of the counterparty is to reduce supply of the electric power from the electric system to the electric power storage device.

8. The electric power management system according to claim 1, wherein the exchange of the electric power between the electric power storage device of the vehicle and the electric system of the counterparty is to increase supply of the electric power from the electric system to the electric power storage device.

9. An electric power management server that is included in an electric power management system for performing an exchange of electric power between an electric power storage device and an electric system of a counterparty of the exchange of the electric power, and that includes a processor, wherein the processor is configured to detect a predetermined operation of a user that correlates with termination of the exchange of the electric power, calculate an estimated time for the termination of the exchange of the electric power in a case where the predetermined operation is detected, wherein the estimated time is calculated by adding a required period for a vehicle to leave a virtual power plant to a time when the predetermined operation is detected, and the required period is stored in the server in advance, and distribute the electric power to be exchanged by the vehicle in which the exchange of the electric power is estimated to be terminated at the calculated estimated time to another vehicle that exchanges the electric power with the electric system.

10. The electric power management system according to claim 1, wherein the processor is further configured to:

determine whether a predetermined condition for planning or replanning a first demand response request is satisfied in a case where the first demand response request is received;

determine a combination of vehicles in the plurality of vehicles to which the first demand response request is made in accordance with a second demand response request received from an aggregator, in a case where the processor determines that the predetermined condition for planning or replanning the first demand response request is satisfied;

transmit first information for making the first demand response request to a mobile terminal of the user based on the determination of the combination of the vehicles;

determine whether the electric power management system has received a signal indicating that the first demand response request is granted from the mobile terminal;

add second information related to the user to a list of users that grants the first demand response request in a case where the processor determines that the signal is received from the mobile terminal;

determine whether to execute a demand response indicated in the first demand response request; and transmit, to the mobile terminal, a demand response signal for executing the first demand response, in a case where the processor determines to execute the demand response.

11. The electric power management system according to claim 1, wherein the required period is from when the user performs the predetermined operation until when the vehicle leaves the virtual power plant.

12. The electric power management system according to claim 9, wherein the required period is from when the user performs the predetermined operation until when the vehicle leaves the virtual power plant.

13. An electric power management system configured to perform an exchange of electric power between an electric power storage device and an electric system of a counterparty of the exchange of the electric power, the electric power management system comprising:

a plurality of vehicles, each including the electric power storage device; and a server including a processor, wherein the processor is configured to detect a predetermined operation of a user that correlates with termination of the exchange of the electric power, estimate a termination time to terminate the exchange of the electric power in a case where the predetermined operation is detected, wherein the termination time is a point in time after a predetermined time has elapsed since the detection of the predetermined operation, and the predetermined time, stored in the server in advance, is an amount of a time required for a vehicle to leave a virtual power plant, and distribute the electric power exchanged by the vehicle in which the exchange of the electric power is expected to be terminated at the estimated termination time, to another vehicle.

* * * * *